United States Patent
O'Neill

(10) Patent No.: US 9,533,372 B2
(45) Date of Patent: Jan. 3, 2017

(54) METHOD OF ELIMINATING SUB-SURFACE POROSITY

(71) Applicant: United Technologies Corporation, Hartford, CT (US)

(72) Inventor: Christopher F. O'Neill, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/888,670

(22) PCT Filed: May 2, 2014

(86) PCT No.: PCT/US2014/036563
§ 371 (c)(1),
(2) Date: Nov. 2, 2015

(87) PCT Pub. No.: WO2014/179679
PCT Pub. Date: Nov. 6, 2014

(65) Prior Publication Data
US 2016/0052087 A1    Feb. 25, 2016

Related U.S. Application Data

(60) Provisional application No. 61/819,127, filed on May 3, 2013.

(51) Int. Cl.
*B22F 3/00* (2006.01)
*B23K 26/06* (2014.01)
(Continued)

(52) U.S. Cl.
CPC ......... *B23K 26/0604* (2013.01); *B22F 3/1055* (2013.01); *B23K 26/342* (2015.10);
(Continued)

(58) Field of Classification Search
CPC .................................................... B22F 1/0055
See application file for complete search history.

(56) References Cited

U.S. PATENT DOCUMENTS 4,863,538 A    9/1989  Deckard
5,155,324 A    10/1992 Deckard et al.
(Continued)

FOREIGN PATENT DOCUMENTS

CN    1334158 A      2/2002
DE    10112591 A1    10/2001
(Continued)

OTHER PUBLICATIONS

International Search Report and Written Opinion from PCT Application Serial No. PCT/US2014/036563, dated Sep. 4, 2014, 9 pages.
(Continued)

*Primary Examiner* — George Wyszomierski
*Assistant Examiner* — Ngoclan T Mai
(74) *Attorney, Agent, or Firm* — Kinney & Lange, P.A.

(57) ABSTRACT

A method for operating an additive manufacturing apparatus, the method comprises directing a first energy beam along a surface contour vector in a build plane. A second energy beam is directed along a plurality of substantially parallel hatch vectors disposed in the build plane inward of the surface contour vector. A sum of the surface contour vector and the plurality of hatch vectors define a processed powder region in the build plane. A third energy beam is directed along an offset contour vector in the build plane. The offset contour vector includes a plurality of unprocessed powder regions in the build plane between the surface contour vector and the plurality of hatch vectors.

23 Claims, 3 Drawing Sheets

(51) Int. Cl.
*B29C 67/00* (2006.01)
*B22F 3/105* (2006.01)
*B33Y 10/00* (2015.01)
*B29K 105/00* (2006.01)

(52) U.S. Cl.
CPC ...... *B29C 67/0077* (2013.01); *B29C 67/0088* (2013.01); *B29K 2105/251* (2013.01); *B33Y 10/00* (2014.12)

(56) References Cited

U.S. PATENT DOCUMENTS

| | | | |
|---|---|---|---|
| 5,304,329 | A | 4/1994 | Dickens, Jr. et al. |
| 5,352,405 | A | 10/1994 | Beaman et al. |
| 5,669,433 | A | 9/1997 | Sterett et al. |
| 5,746,844 | A | 5/1998 | Sterett et al. |
| 5,932,055 | A | 8/1999 | Newell et al. |
| 6,406,658 | B1 | 6/2002 | Manners et al. |
| 6,519,500 | B1 | 2/2003 | White |
| 6,621,039 | B2 | 9/2003 | Wang et al. |
| 7,141,207 | B2 | 11/2006 | Jandeska, Jr. et al. |
| 2003/0127436 | A1 | 7/2003 | Darrah et al. |
| 2004/0099996 | A1 | 5/2004 | Herzog |
| 2008/0118665 | A1 | 5/2008 | Slaughter |
| 2009/0206065 | A1 | 8/2009 | Kruth et al. |
| 2012/0099923 | A1 | 4/2012 | Meyer et al. |
| 2012/0222306 | A1 | 9/2012 | Mittendorf et al. |
| 2013/0039799 | A1 | 2/2013 | Bono et al. |
| 2013/0071562 | A1 | 3/2013 | Szuromi et al. |
| 2013/0264750 | A1* | 10/2013 | Hofacker .............. B22F 3/1055 264/497 |

FOREIGN PATENT DOCUMENTS

| | | |
|---|---|---|
| EP | 0606839 A1 | 7/1994 |
| WO | WO2012143923 A2 | 10/2012 |

OTHER PUBLICATIONS

Senthilkumaran, K. et al.. "Influence of building strategies on the accuracy of parts in selective laser sintering", Materials and Design. 2009, vol. 30, pp. 2946-2954.

Zhang, W. et al.. 'Consecutive sub-sector scan mode with adjustable scan lengths for selective laser melting technology', Int J Adv Manuf Technol. 2009 vol. 41, pp. 706-713.

First Chinese Office Action, for Chinese Patent Application No. 201480025138.5, dated Sep. 5, 2016, 8 pages.

Extended European Search Report, for European Patent Application No. 14791974.0, dated Oct. 24, 2016, 8 pages.

* cited by examiner

METHOD OF ELIMINATING SUB-SURFACE POROSITY

BACKGROUND

The described subject matter relates generally to the field of additive manufacturing. In particular, the subject matter relates to operating an energy beam to facilitate additive manufacturing.

Additive manufacturing refers to a category of manufacturing methods characterized by the fact that the finished part is created by layer-wise construction of a plurality of thin sheets of material. Additive manufacturing may involve applying liquid or powder material to a workstage, then doing some combination of sintering, curing, melting, and/or cutting to create a layer. The process is repeated up to several thousand times to construct the desired finished component or article.

Various types of additive manufacturing are known. Examples include stereo lithography (additively manufacturing objects from layers of a cured photosensitive liquid), electron beam melting (using a powder as feedstock and selectively melting the powder using an electron beam), laser additive manufacturing (using a powder as a feedstock and selectively melting the powder using a laser), and laser object manufacturing (applying thin solid sheets of material over a workstage and using a laser to cut away unwanted portions).

In additive manufacturing, conventional apparatus utilize a galvanometer type scanner to melt powder layers in an X-Y linear orientation. This linear path is broken up into smaller sections, called rastering. This causes discontinuity in the scanning paths, and can result in small but significant areas of unmelted powder therebetween, which operate as stress risers in the finished part.

SUMMARY

A method for operating an additive manufacturing apparatus comprises directing a first energy beam along a surface contour vector in a build plane. A second energy beam is directed along a plurality of substantially parallel hatch vectors disposed in the build plane inward of the surface contour vector. A sum of the surface contour vector and the plurality of hatch vectors define a processed powder region in the build plane. A third energy beam is directed along an offset contour vector in the build plane. The offset contour vector includes a plurality of unprocessed powder regions in the build plane between the surface contour vector and the plurality of hatch vectors.

A method for building an object by additive manufacturing comprises providing a first layer of raw materials to a first build location disposed along a first build plane. An energy beam is generated at a location spaced apart from the first build plane. The energy beam is directed along a first beam path in the first build plane. The first beam path includes a first surface contour vector, a plurality of substantially parallel first hatch vectors disposed inward of the first surface contour vector, and a first offset contour vector. The offset contour vector includes a first plurality of unprocessed powder regions in the first build plane between the first surface contour vector and the plurality of first hatch vectors.

DETAILED DESCRIPTION

Figure 1:
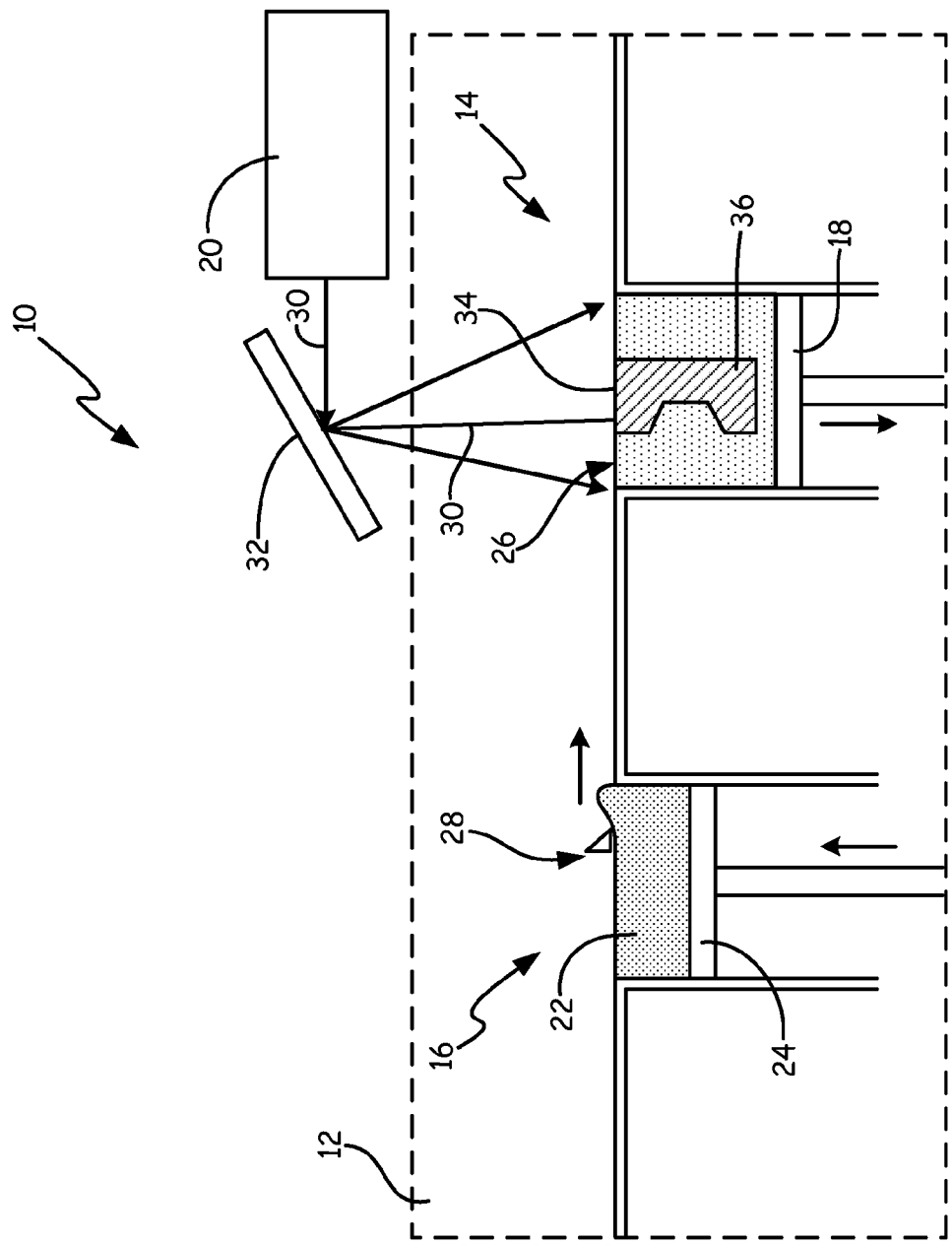
FIG. 1 schematically depicts a powder bed additive manufacturing device.

FIG. 1 is a schematic of an example additive manufacturing system 10 with build chamber 12. Build chamber 12 contains one or more devices that are capable of producing solid freeform objects by additive manufacturing. Non-limiting embodiments of such devices include those which fabricate objects by direct laser sintering (DLS) manufacturing, direct laser melting (DLM) manufacturing, selective laser sintering (SLS) manufacturing, selective laser melting (SLM) manufacturing, laser engineering net shaping (LENS) manufacturing, electron beam melting (EBM) manufacturing, direct metal deposition (DMD) manufacturing, and others known in the art.

FIG. 1 shows a detailed example of a powder bed build device 14 disposed in build chamber 12. A non-limiting example embodiment such as SLS device 14 is housed in build chamber 12, and includes powder storage chamber 16, build platform 18, and energy beam generating apparatus 20. During operation of SLS device 14, raw material powder 22 is fed upward by piston 24 and is spread over build surface 26 by roller or recoater blade 28. After powder 22 is spread onto build surface 26, energy beam generator 20 is activated to direct a laser or electron beam 30. Beam 30 can be steered using a number of different apparatus, such as but not limited to mirror 32, so as to sinter selective areas of powder 22 along a build plane. The sintered powder forms a single component build layer 34 of solid object 36 adhered to the underlying platform (or a preceding build layer) according to a computer model of object 36 stored in an STL memory file. Roller or recoater 28 is returned to a starting position, piston 24 advances to expose another layer of powder, and build platform 18 indexes down by one layer thickness and the process repeats for each successive build surface 26 and build plane until solid freeform object 36 is completed. SLS device 14 is only one example of solid freeform manufacturing apparatus and is not meant to limit the invention to any single machine known in the art.

Figure 2:
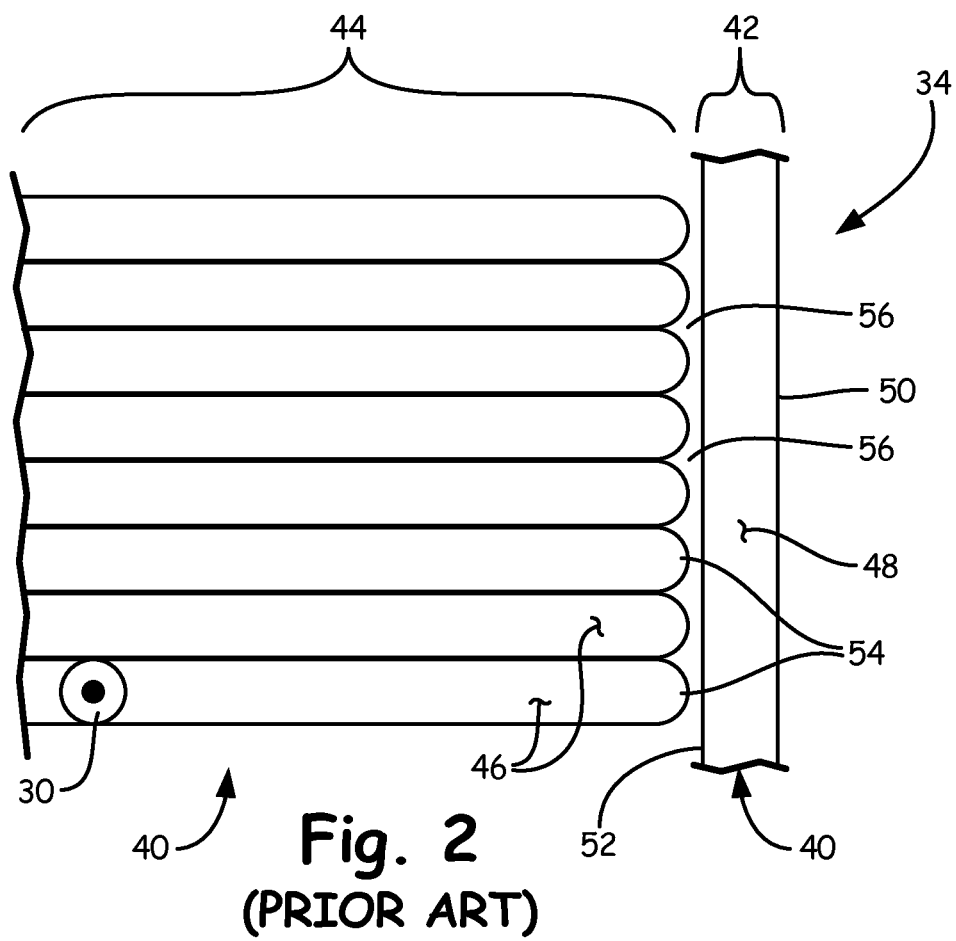
FIG. 2 is a prior art beam path for the powder bed device.

FIG. 2 shows example prior art beam path 40 to form component build layer 34. Using an additive manufacturing machine such as SLS device 14, beam path 40 is typically divided into two portions for build each layer: surface portion 42 and core portion 44. Beam 30 is usually operated at lower power, and is directed along surface path portion 42 at slower scanning speeds as compared to the higher power and faster scanning speeds of core portion 44. The different beam power and scanning speeds improve surface finish while maintaining suitable processing time and throughput for each object 36.

Prior art techniques such as those shown in FIG. 2 separate or retract core hatch vectors 46 relative to surface contour vector 48 so that they do not overlap. A single surface contour vector 48 thus extends along object outer surface 50. If hatch vectors 46 and surface contour vectors overlap to the point where the same region is melted three or more times, a wood-grain finish can result on object surface 50. Inner edge 52 of surface contour vector 48 may abut, but does not overlap ends 54 of adjacent hatch vectors 46. Thus for surface finish reasons, unprocessed powder regions 56 often remain below object outer surface 50 after processing each build layer using existing techniques.

In some cases, through conductive and radiative heating, the proximity of the hatch vector ends 54 to inner edge of the single surface contour vector 48 is sufficient to melt powder in some but not all of unprocessed powder regions 56. As a result, unprocessed powder regions 56 remain partially or completely unmelted even after all the build process is otherwise complete. Thus a subsequent processing step such as hot isostatic processing (HIP) is required to consolidate the powder in unprocessed powder regions 56 to remove the porosity that would otherwise remain in the finished part. Though this process improves surface finish, it requires additional time, equipment, and expense to avoid originating high-cycle fatigue defects caused by the presence of unprocessed powder immediately below object surface 50.

Figure 3A:
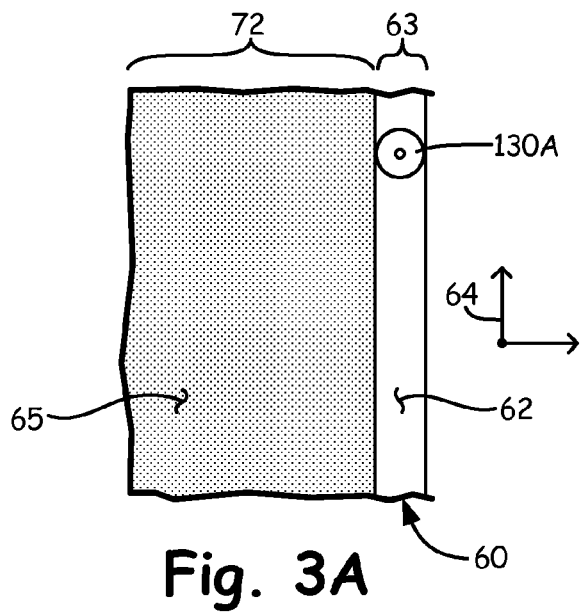
FIG. 3A shows a surface contour vector forming a first part of a beam path.
Figure 3B:
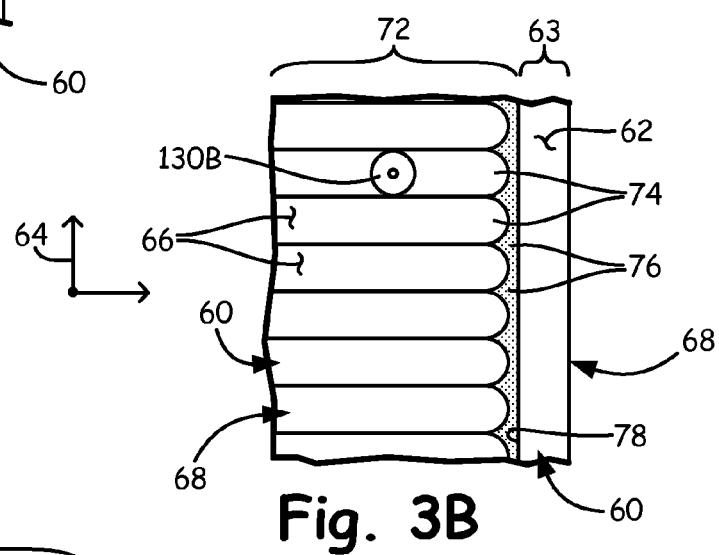
FIG. 3B shows a plurality of hatch vectors forming a second part of the beam path.
Figure 3C:
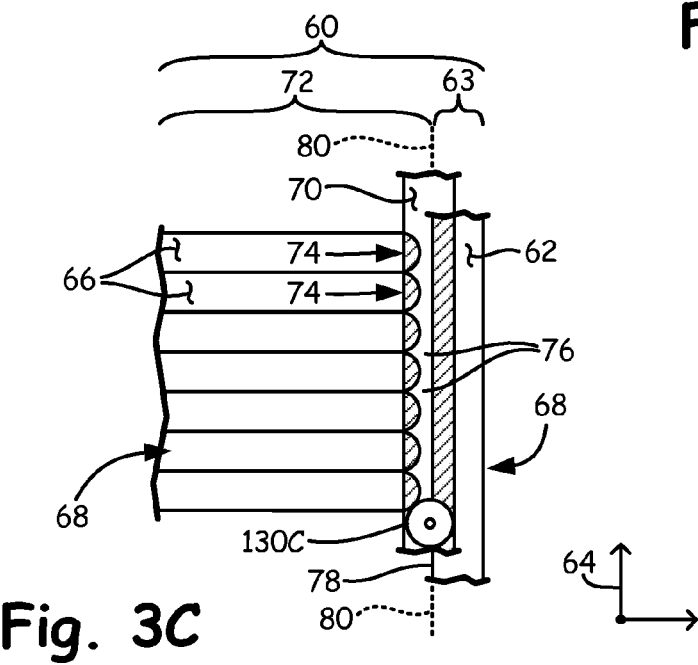
FIG. 3C shows an offset contour vector forming a third part of the beam path.

FIGS. 3A-3C show portions of an alternate beam path 60 for an example build plane. This path eliminates unprocessed powder which alleviates the need for subsequent HIP processing or other powder consolidation, while maintaining a suitable surface finish. For each build plane, beam path 60 includes three parts shown in each of FIGS. 3A-3C. In FIG. 3A, a first energy beam 130A is directed along single surface contour vector 62 in build plane 64. A second portion of beam path 60 is shown in FIG. 3B, where a second energy beam 130B is directed along a plurality of substantially parallel hatch vectors 66, disposed in build plane 64, inward of surface contour vector 62. And FIG. 3C shows a third portion of beam path 60 in which a third energy beam 130C is directed along offset contour vector 70 in build plane 64. Though shown as three separate beams, all can be generated a single beam (e.g., an electron or laser beam 30 shown in FIG. 1) and/or can be generated from a single beam source or multiple sources.

Referring first to FIG. 3A, first beam 130A is directed along surface contour vector 62. In certain embodiments, first beam 130A is directed along single surface contour vector 62 in build plane 64. Surface contour vector 62, along surface region 63, can provide a boundary for the as-yet unprocessed powder 65 in core region 72. Surface region 63 can refer not only to the outer or perimeter surface of a component, it can also refer to one or more boundary surfaces of a variety of internal features if desired. Examples include but are not limited to holes, cavities, passages, voids, and the like. The beam power and scanning speed of beam 130A can be selected to provide a suitable microstructure and surface finish to each surface region 63.

In FIG. 3B, second energy beam 130B is directed along substantially parallel hatch vectors 66. Each hatch vector 66 includes a hatch vector end 74 disposed immediately inward of surface contour vector 62. A sum of the surface contour vector 62 and the plurality of hatch vectors 66 define processed powder region 68 in build plane 64, leaving a plurality of unprocessed powder regions 76 in build plane 64 between surface contour vector 62 and the plurality of hatch vectors 66.

One or more hatch vector ends 74 is disposed adjacent to inner edge 78 of surface contour vector 62. Hatch vector ends 74 may be rounded in accordance with the shape of beam 130B. In certain embodiments, hatch vector ends 74 are spaced apart from surface contour vector inner edge 78. However, regardless of shape, hatch vector ends 74 abut but do not overlap, surface contour vector inner edge 78.

The position of hatch vector ends 74 inward of surface contour vector 62 permits rastering of core region 72. In FIG. 3B, the plurality of substantially parallel hatch vectors 66 are shown as individual vectors. However, it will be appreciated that the plurality of hatch vectors 66 can alternatively form a continuous path with a plurality of rounded transitional vectors (not shown) connecting ends 74 of adjacent ones of the plurality of hatch vectors 66.

FIG. 3C shows third energy beam 130C following the third portion of beam path 60, in which offset contour vector 70 is disposed on an inner side of surface contour vector 62. Offset contour vector 70 includes the plurality of unprocessed powder regions 76 between surface contour vector 62 and the plurality of hatch vectors 66.

Center line 80 of offset contour vector 70 can overlap the plurality of rounded hatch vector ends 74 adjacent one or more of the unprocessed powder regions 76. In certain embodiments, offset contour vector 70 also overlaps an inner portion of surface contour vector 62 adjacent to the plurality of unprocessed powder regions 70. But since hatch vector ends 74 do not overlap surface contour vector inner edge 78, a combination of surface contour vector 62, offset contour vector 70, and the plurality of hatch vectors 66 define a beam path 60 which has no more than two overlapping vectors at any point in each build plane 64.

Locations where the beam passes twice over the same area can include, for example one or more hatch vector ends 74 and/or surface contour vector inner edge 78. These areas are shaded accordingly. Excess heating effects from multiple beam passes in these areas, which are caused by the addition of offset contour vector 70, can be minimized by adjusting the beam power and/or speed proximate rounded hatch vector ends 74. Offset contour vector 70 also allows marginally larger spacing between surface contour vector 62 and the plurality of hatch vectors 66 than would otherwise be utilized when trying to minimize the amount of powder requiring consolidation.

In certain embodiments, a width of surface contour vector 62 is substantially equivalent to a width of offset contour vector 70. This can allow center line 80 of offset contour vector 70 to follow surface contour vector inner edge 78, so that surface contour vector 62 and offset contour vector 70 overlap by about 50% of the beam width below object surface 80.

The steps shown in FIGS. 3A-3C can be performed in the order shown, or can be rearranged based on various criteria. In one example, depending on the desired type of surface finish, and the susceptibility of the previously solidified materials to remelting, the order of the steps can be adjusted so as to either allow cooling or prevent cooling of certain areas prior to the second pass of the beam. For example, first energy beam 130A can be directed along surface contour vector 62 prior to directing second energy beam 130B along the plurality of substantially parallel hatch vectors 66. This can be done, for example, to provide a boundary surface prior to melting the core powder along hatch vectors 66. Alternatively, first energy beam 130A can be directed along surface contour vector 62 subsequent to directing second energy beam 130B along the plurality of substantially parallel hatch vectors 66 to reprocess the initial surface finish.

In certain embodiments, third energy beam 130C can be directed along offset contour vector 70 between the steps of directing first energy beam 130A along surface contour vector 62 and second energy beam 130B along the plurality of substantially parallel hatch vectors 66. Alternatively, third energy beam 130C can be directed along offset contour vector 70 after surface contour vector 62 and hatch vectors 66, which allows the power and speed of third energy beam 130C to be minimally sufficient for melting and solidifying any remaining powder between surface contour vector 62 and hatch vectors 66. In this way, the risk of remelting and low quality surface finishes can be further reduced.

FIGS. 3A-3C show an example beam path 60 for forming a component build layer in a single build plane 64. It will be appreciated that once the powder in build plane 64 is processed, a new layer of raw material powder can be deposited so the process can be repeated for subsequent parallel build planes. Each subsequent build planes can include at least a portion of the preceding component build layer. Thus the steps shown in FIGS. 3A-3C can be incorporated, for example, into operation of a powder bed build device such as SLS device 14 as described above with respect to FIG. 1.

Though FIGS. 3A-3C depict a small portion of a build plane in which a component build layer is formed with a substantially linear surface region and corresponding linear contour vectors, the linear arrangement is shown merely for simplicity of illustration and is not meant to be limiting to any particular component shape. It will therefore be recognized that the beam path and vectors can include varying degrees and instances of curvature throughout the surface region of each individual build plane.

EXAMPLE

In one example of the process, a model of an object to be formed is defined in an electronic STL data file, which is loaded into the memory of a powder bed SLS device. The controller of the SLS device divides the STL model into slices of 0.020 mm thickness. Each slice corresponds to a build plane.

A surface contour vector corresponding to a beam width of 0.066 mm is generated to control the laser beam and steer it along the outer surface of a first build plane. A plurality of substantially parallel hatch vectors corresponding to a beam width of 0.015 mm are generated to control the beam through the core portion of the first build plane. Ends of the adjacent hatch vectors have a roundness of 45° corresponding to a rounded beam. The sum of these vectors leave unprocessed powder regions in the first build plane just inward of the surface contour vector.

An offset contour vector is generated in the first build plane which overlaps these unprocessed regions, as well as an inner side of the surface contour vector, and portions of the rounded transitional vectors. The offset contour vector also corresponds to a beam width of 0.066 mm, and a centerline of this vector generally follows a center line of the surface contour vector. The respective center lines of the two contour vectors are offset by about 0.033 mm, or about 50% of the beam width.

In a fully formed part, a beam path is generated for each of the slices/build planes of the STL model. Some or all of these beam paths used to build the fully formed part can include an offset contour vector as described above, in addition to a surface contour vector and hatch vectors.

Discussion of Possible Embodiments

The following are non-exclusive descriptions of possible embodiments of the present invention:

A method for operating an additive manufacturing apparatus comprises directing a first energy beam along a surface contour vector in a build plane. A second energy beam is directed along a plurality of substantially parallel hatch vectors disposed in the build plane inward of the surface contour vector. A sum of the surface contour vector and the plurality of hatch vectors define a processed powder region in the build plane. A third energy beam is directed along an offset contour vector in the build plane. The offset contour vector includes a plurality of unprocessed powder regions in the build plane between the surface contour vector and the plurality of hatch vectors.

The method of the preceding paragraph can optionally include, additionally and/or alternatively, any one or more of the following features, steps, configurations and/or additional components:

A further embodiment of the foregoing method, wherein the step of directing an energy beam along a plurality of substantially parallel hatch vectors comprises directing the second energy beam along a continuous path including a plurality of rounded transitional vectors connecting adjacent ones of the plurality of hatch vectors.

A further embodiment of any of the foregoing methods, wherein each of the plurality of substantially parallel hatch vectors include at least one rounded hatch vector end disposed immediately inward of an inner edge of the surface contour vector such that the plurality of substantially parallel hatch vectors and the inner edge of the surface contour vector do not overlap.

A further embodiment of any of the foregoing methods, wherein a center line of the offset contour vector overlaps the plurality of rounded hatch vector ends adjacent the plurality of unprocessed powder regions.

A further embodiment of any of the foregoing methods, wherein the offset contour vector overlaps an inner portion of the surface contour vector adjacent to the plurality of unprocessed powder regions.

A further embodiment of any of the foregoing methods, wherein a combination of the surface contour vector, the offset contour vector, and the plurality of hatch vectors define a beam path having no more than two overlapping vectors at any point in the build plane.

A further embodiment of any of the foregoing methods, wherein a width of the surface contour vector is substantially equivalent to a width of the offset contour vector.

A further embodiment of any of the foregoing methods, wherein a center line of the offset contour vector follows an inner edge of the surface contour vector.

A further embodiment of any of the foregoing methods, wherein the step of directing the first energy beam along the surface contour vector is performed prior to the step of directing the second energy beam along the plurality of substantially parallel hatch vectors.

A further embodiment of any of the foregoing methods, wherein the step of directing the first energy beam along the surface contour vector is performed subsequent to the step of directing the second energy beam along the plurality of substantially parallel hatch vectors.

A further embodiment of any of the foregoing methods, wherein the step of directing the third energy beam along the offset contour vector is performed between the steps of directing the first energy beam along the surface contour vector and directing the second energy beam along the plurality of substantially parallel hatch vectors.

A further embodiment of any of the foregoing methods, wherein the method is performed by operating a powder bed additive manufacturing apparatus, the apparatus selected from a group consisting of: a direct laser sintering apparatus; a direct laser melting apparatus; a selective laser sintering apparatus; a selective laser melting apparatus; a laser engineered net shaping apparatus; an electron beam melting apparatus; and a direct metal deposition apparatus.

A method for building an object by additive manufacturing comprises providing a first layer of raw materials to a first build location disposed along a first build plane. An energy beam is generated at a location spaced apart from the first build plane. The energy beam is directed along a first beam path in the first build plane. The first beam path includes a first surface contour vector, a plurality of substantially parallel first hatch vectors disposed inward of the first surface contour vector, and a first offset contour vector. The offset contour vector includes a first plurality of unprocessed powder regions in the first build plane between the first surface contour vector and the plurality of first hatch vectors.

The method of the preceding paragraph can optionally include, additionally and/or alternatively, any one or more of the following features, steps, configurations and/or additional components:

A further embodiment of the foregoing method, wherein the plurality of substantially parallel first hatch vectors each include a plurality of rounded hatch vector ends disposed immediately inward of an inner edge of the first surface contour vector.

A further embodiment of any of the foregoing methods, wherein a center line of the first offset contour vector overlaps the plurality of rounded hatch vector ends adjacent the plurality of first unprocessed powder regions.

A further embodiment of any of the foregoing methods, wherein a combination of the first surface contour vector, the first offset contour vector, and the plurality of first hatch vectors define the first beam path covering the entirety of a portion of the first build plane bounded by the first surface contour vector.

A further embodiment of any of the foregoing methods, wherein the first beam path has no more than two overlapping vectors at any point in the first build plane.

A further embodiment of any of the foregoing methods, wherein a center line of the first offset contour vector follows an inner edge of the first surface contour vector.

A further embodiment of any of the foregoing methods, wherein the first beam path also includes a plurality of rounded first transitional vectors connecting adjacent ones of the plurality of first hatch vectors.

A further embodiment of any of the foregoing methods, further comprising solidifying the first layer of raw materials subsequent to directing the energy beam along the first beam path to form a first component build layer.

A further embodiment of any of the foregoing methods, further comprising providing a second layer of raw materials to a second build location disposed along a second build plane parallel to the first build plane; generating an energy beam at a location spaced apart from the second build plane; and directing the energy beam along a second beam path in the second build plane, the second build plane including a second surface contour vector, a plurality of substantially parallel second hatch vectors disposed inward of the second surface contour vector, and a second offset contour vector, the offset contour vector including a second plurality of unprocessed powder regions in the second build plane between the second surface contour vector and the plurality of second hatch vectors.

A further embodiment of any of the foregoing methods, wherein a combination of the second surface contour vector, the second offset contour vector, and the plurality of second hatch vectors define the second beam path having no more than two overlapping vectors at any point in the second build plane.

A further embodiment of any of the foregoing methods, wherein the second build location includes at least a portion of the first component build layer.

Although the present invention has been described with reference to preferred embodiments, workers skilled in the art will recognize that changes may be made in form and detail without departing from the spirit and scope of the invention.

The invention claimed:

1. A method for operating an additive manufacturing apparatus, the method comprising:
   directing a first energy beam along a surface contour vector in a build plane;
   directing a second energy beam along a plurality of substantially parallel hatch vectors disposed in the build plane inward of the surface contour vector, a sum of the surface contour vector and the plurality of hatch vectors defining a processed powder region in the build plane; and
   directing a third energy beam along an offset contour vector in the build plane, the offset contour vector including a plurality of unprocessed powder regions in the build plane between the surface contour vector and the plurality of hatch vectors.

2. The method of claim 1, wherein the step of directing an energy beam along a plurality of substantially parallel hatch vectors comprises:
   directing the second energy beam along a continuous path including a plurality of rounded transitional vectors connecting adjacent ones of the plurality of hatch vectors.

3. The method of claim 1, wherein each of the plurality of substantially parallel hatch vectors include at least one rounded hatch vector end disposed immediately inward of an inner edge of the surface contour vector such that the plurality of substantially parallel hatch vectors and the inner edge of the surface contour vector do not overlap.

4. The method of claim 1, wherein a center line of the offset contour vector overlaps the plurality of rounded hatch vector ends adjacent the plurality of unprocessed powder regions.

5. The method of claim 1, wherein the offset contour vector overlaps an inner portion of the surface contour vector adjacent to the plurality of unprocessed powder regions.

6. The method of claim 1, wherein a combination of the surface contour vector, the offset contour vector, and the plurality of hatch vectors define a beam path having no more than two overlapping vectors at any point in the build plane.

7. The method of claim 1, wherein a width of the surface contour vector is substantially equivalent to a width of the offset contour vector.

8. The method of claim 1, wherein a center line of the offset contour vector follows an inner edge of the surface contour vector.

9. The method of claim 1, wherein the step of directing the first energy beam along the surface contour vector is performed prior to the step of directing the second energy beam along the plurality of substantially parallel hatch vectors.

10. The method of claim 1, wherein the step of directing the first energy beam along the surface contour vector is performed subsequent to the step of directing the second energy beam along the plurality of substantially parallel hatch vectors.

11. The method of claim 1, wherein the step of directing the third energy beam along the offset contour vector is performed between the steps of directing the first energy beam along the surface contour vector and directing the second energy beam along the plurality of substantially parallel hatch vectors.

12. The method of claim 1, wherein the method is performed by operating a powder bed additive manufacturing apparatus, the apparatus selected from a group consisting of:
- a direct laser sintering apparatus;
- a direct laser melting apparatus;
- a selective laser sintering apparatus;
- a selective laser melting apparatus;
- a laser engineered net shaping apparatus;
- an electron beam melting apparatus; and
- a direct metal deposition apparatus.

13. A method for building an object by additive manufacturing, the method comprising:
- providing a first layer of raw materials to a first build location disposed along a first build plane;
- generating an energy beam at a location spaced apart from the first build plane;
- directing the energy beam along a first beam path in the first build plane, the first beam path including a first surface contour vector, a plurality of substantially parallel first hatch vectors disposed inward of the first surface contour vector, and a first offset contour vector, the offset contour vector including a first plurality of unprocessed powder regions in the first build plane between the first surface contour vector and the plurality of first hatch vectors.

14. The method of claim 13, wherein the plurality of substantially parallel first hatch vectors each include a plurality of rounded hatch vector ends disposed immediately inward of an inner edge of the first surface contour vector.

15. The method of claim 14, wherein a center line of the first offset contour vector overlaps the plurality of rounded hatch vector ends adjacent the plurality of first unprocessed powder regions.

16. The method of claim 13, wherein a combination of the first surface contour vector, the first offset contour vector, and the plurality of first hatch vectors define the first beam path covering the entirety of a portion of the first build plane bounded by the first surface contour vector.

17. The method of claim 13, wherein the first beam path has no more than two overlapping vectors at any point in the first build plane.

18. The method of claim 13, wherein a center line of the first offset contour vector follows an inner edge of the first surface contour vector.

19. The method of claim 13, wherein the first beam path also includes a plurality of rounded first transitional vectors connecting adjacent ones of the plurality of first hatch vectors.

20. The method of claim 13, further comprising:
- solidifying the first layer of raw materials subsequent to directing the energy beam along the first beam path to form a first component build layer.

21. The method of claim 20, further comprising:
- providing a second layer of raw materials to a second build location disposed along a second build plane parallel to the first build plane;
- generating an energy beam at a location spaced apart from the second build plane; and
- directing the energy beam along a second beam path in the second build plane, the second build plane including a second surface contour vector, a plurality of substantially parallel second hatch vectors disposed inward of the second surface contour vector, and a second offset contour vector, the offset contour vector including a second plurality of unprocessed powder regions in the second build plane between the second surface contour vector and the plurality of second hatch vectors.

22. The method of claim 21, wherein a combination of the second surface contour vector, the second offset contour vector, and the plurality of second hatch vectors define the second beam path having no more than two overlapping vectors at any point in the second build plane.

23. The method of claim 21, wherein the second build location includes at least a portion of the first component build layer.

* * * * *